March 21, 1967 G. K. WEHNER ETAL 3,310,424
METHOD FOR PROVIDING AN INSULATING FILM ON A SUBSTRATE
Filed May 14, 1963
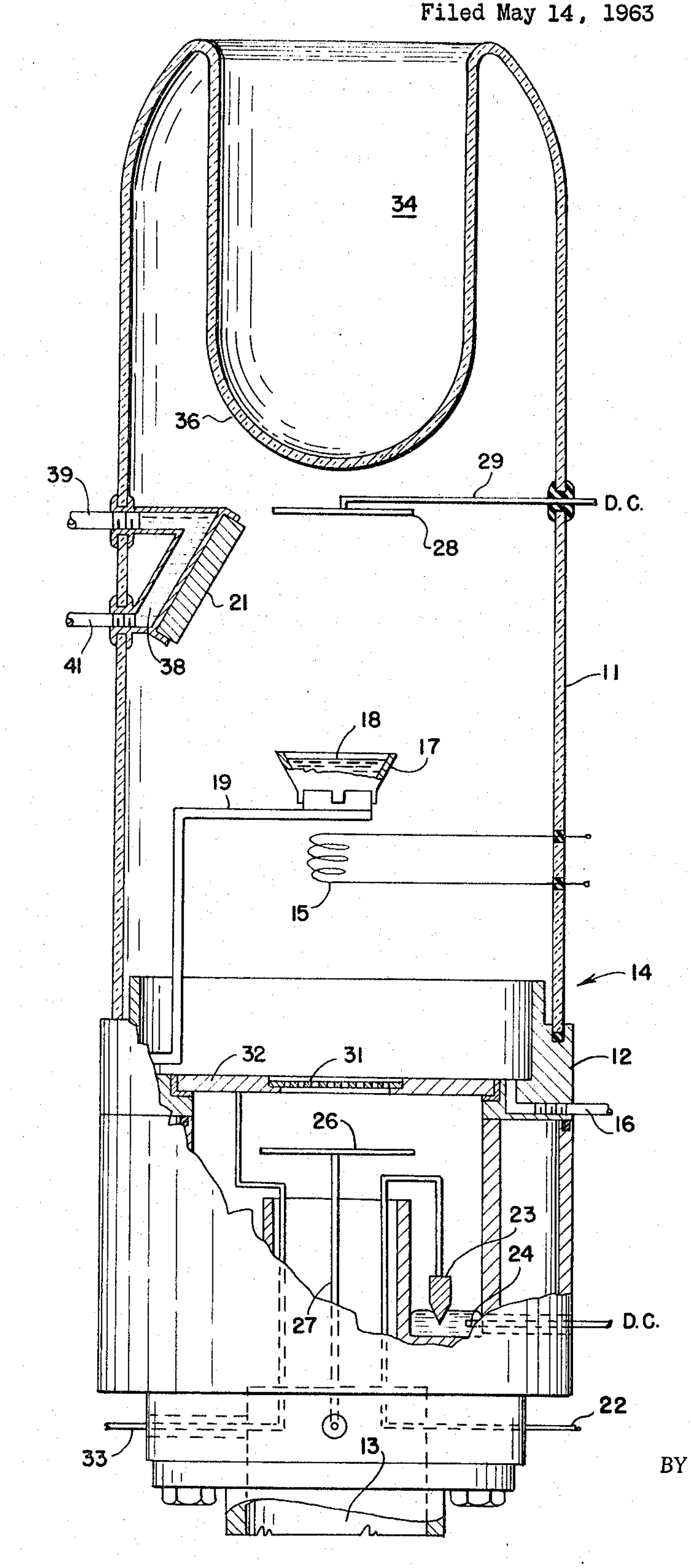
INVENTORS
WILLIAM N. MAYER
GOTTFRIED K. WEHNER
BY
Harold D. Jastram
ATTORNEY United States Patent Office 3,310,424
Patented Mar. 21, 1967

3,310,424
METHOD FOR PROVIDING AN INSULATING FILM ON A SUBSTRATE

Gottfried K. Wehner, Minneapolis, and William N. Mayer, White Bear Lake, Minn., assignors, by mesne assignments, to Litton Systems, Inc., Beverly Hills, Calif., a corporation of Maryland Filed May 14, 1963, Ser. No. 280,393
4 Claims. (Cl. 117—106)

This invention relates to a process of coating a substrate and more particularly to coating a substrate with an insulating layer of material which is vaporized in a plasma.

Silicones, such as the silicone oils and greases, have certain desirable electrical properties. These properties include high dielectric strength, thermal and oxidative stability, low dielectric losses, etc. The electrical insulating property makes them particularly useful for coating electrical components, however, since these silicones are essentially liquid, their usefulness is limited. Consider a capacitor where an insulator is needed between the successive layers of rolled metal foil plates. In such a component, the liquid characteristic of the noted silicones make them unusable.

Silicon monoxide has been successfully used because it can be deposited in solid form on a metal foil. Silicon monoxide is effective in this use because it takes up little or no space thus permitting the components to be relatively small.

Customarily, these solid silicon monoxide coatings are placed on substrates such as metal foil by simply heating the silicon monoxide in powder form by conventional means so that the powder is vaporized, or it is bombarded with electrons. The vapor of the silicon monoxide deposits on the metal sheets. Several limitations occur however as a result of conventional deposition of silicon monoxide on a substrate. The thickness of the layer which may be obtained by conventional deposition methods is limited to something less than one micron thickness. This limits the maximum potential which may be placed across a layer of the deposited silicon in an electrical component. Coupled with the limited thickness attainable by conventional means, is the insulating limitation of the material thus deposited. In other words, silicon monoxide which is deposited in conventional processes has limitations in the insulating properties of the solid layer. The limitation in the insulating properties, together with the limited thickness attainable by conventional means reduces the effectiveness of the deposited layer as an electrical insulator. An additional limitation which has been a problem is the tendency of the deposited solid layer of silicon monoxide to peel away, or separate, from the substrate, thus resulting in an unsatisfactory product and a component which may have a markedly reduced electrical utility. Also the growth rate of the layer is very slow.

It is therefore an object of the present invention to provide a new and improved process for depositing a solid insulator on a substrate.

It is another object of the present invention to provide a new and improved process for vaporizing a liquid for deposition in solid form on a substrate.

It is another object of the present invention to provide a process for depositing a film of polymerized silicone oil on a substrate by vaporizing the silicone oil in a plasma of a noble gas.

It is yet another object of the present invention to provide a process for coating a substrate with a layer of polymerized silicone oil by vaporizing the oil in a discharge plasma generated in argon gas.

The foregoing objectives are achieved by providing a discharge plasma in which a substrate such as a metal plate is positioned together with a substantially liquid silicone such as silicone oil. The oil is vaporized with the heat from the discharge and the vaporized oil is deposited in polymerized form by the action of the ultraviolet light, and ion and electron bombardment at the substrate surface.

Other objectives of the invention will become apparent from the folowing description of one embodiment of an apparatus which might be used to carry out the process in conjunction with the drawings which show a cross section view of an evacuated chamber in which the discharge is established and in which the substrate is coated.

Although the process in the present invention is illustrated and will be described in conjunction with a low pressure argon plasma tube, it is to be understood that it is not limited to any particular means for providing the discharge or to any particular gas utilized to provide the discharge plasma. The teachings of the invention may be applied with corresponding advantages and benefits to a plasma produced by a glow discharge, a high frequency discharge or any other means. Further, the invention is not limited to the use of either a direct current or an alternating current discharge, although the process is described as it is carried out in a direct current discharge.

Certain environmental conditions must be controlled in order to produce films with the desired electrical properties. The plasma may be generated in a closed vessel such as a bell jar or similar closed container. Refer to the figure for an illustration of one type of container which may be used to provide the proper atmosphere for evaporating the liquid silicone. An envelope 11 which is vacuum tight is provided to enclose the various components. Many other configurations such as closed tubes or the like might be used provided, of course, that a discharge plasma can be developed and provided the container, whatever the shape might be, is vacuum tight. The envelope 11 is connected to base member 12. The base member is provided with a large diameter conduit 13 which connects the interior of chamber 14, formed by envelope 11 and base 12 to a vacuum pump (not shown). The chamber 14, may also be provided with a gas inlet 16. The envelope may be made of any material such as glass or the like. It is secured to the base member 12 by well known means which may include bolting the envelope 11 to the base member 12, clamping the members together, or similar means. The important requirement is that the two members be securely attached to prevent a loss of vacuum inside the envelope 11 and to maintain a controlled supply of gas which is to provide the glow discharge plasma within the tank 14.

After the tank 14 has been evacuated, or before it is evacuated, whichever is mechanically most convenient, a crucible 17 containing a supply of the liquid material 18, which is to be evaporated or vaporized, is positioned within the chamber 14. It is positioned in the area where a discharge plasma is developed. The crucible 17 is mounted on a stand 19 which may or may not be energized. If the crucible and the material 18 are not energized, then the stand 19 may simply be an insulating material for supporting the crucible 17. On the other hand, if the material 18 is to be energized, then the stand 19 may be a conducting material which forms part of a lead which extends to the exterior of the tank or chamber 14 where a connection to a source of power may be made.

Crucible 17 may be energized with a positive potential thus increasing the number of electrons which are attracted to the material 18 to heat it. On the other hand, if the crucible is negatively charged, the material 18 will be bombarded with an increased number of positive ions which will heat the material 18 to a greater degree. Either of these approaches may be utilized with success.

A third possibility may concern use of a heater element 15 which may be positioned in the material 18 or it might be placed near the crucible 17 to heat the material. This heater 15 may be energized by an electrical source to increase the temperature of the material 18 so that it evaporates at a greater rate than it would if it were merely heated by the plasma.

The material 18 is a substantially liquid material falling in the silicone group of materials which include silicone oil, silicone greases, certain resins, plastics, and the like. A preferred material 18 is silicone oil which, for purposes of illustration, of the invention, will be hereinafter utilized as an example of the material to be deposited on a target or substrate 21.

After the chamber 14 has been evacuated, the discharge may be established either with the mercury or by introducing gas into the chamber 14 where it will be ionized by application of an electrical energy. Argon gas is introduced into the chamber 14 through inlet 16. Argon gas is being used here to illustrate the application of the principles of this process because it has been found experimentally that the layer of material deposited on the substrate 21 has desirable insulating properties and a particularly secure bond is established between the substrate and the solid oil layer. Other gases, such as the noble gases helium, neon, argon, crypton and xenon or mercury might be used.

After the proper gas concentration is acquired within the enevelope 11, the discharge is started by application of a D.C. potential to the lead 22 so that the ignitor 23 which is in contact with a mercury pool 24 will start the mercury discharge. The electrode 26 is an auxiliary anode utilized to strike and maintain the glow discharge. The D.C. potential is applied between the mercury pool 24 and lead 27 of auxiliary anode 26. A more complete description of this system might be acquired by reference to copending application No. 103,056, filed April 14, 1961, by Gottfried K. Wehner and which is titled Low Pressure Mercury Plasma Discharge Tube, now Patent No. 3,100,272.

A second anode 28 is positioned above the material 18 or anywhere within the envelope 11 and is energized by a source of D.C. voltage which interconnects lead 29 with the mercury pool or cathode lead 24. After discharge is established, the D.C. voltage applied on the anode 28 is in the order of about 30 volts D.C. It is to be noted that the voltages and type of energy applied here by way of example are merely to illustrate the principles of the invention and a glow discharge may be established by means other than the D.C. system which is illustrated.

A screen grid 31 is utilized to separate the cathode chamber wherein the ignitor 23 is located from the anode area which is surrounded by the envelope 11. This screen or grid 31 is mounted in a grid carrier 32 which is insulated from the remainder of the chamber. A lead 33 may be energized by a suitable source of control potential which may be utilized to maintain control of the discharge in the envelope 11. This also is explained in greater detail in the above cited copending application.

In order to maintain the purity of the type of gas utilized for the noble gas discharge, a cold trap 34 is provided in the envelope 11. This reservoir is utilized to accept a concentration of liquid nitrogen, for example, in order to cool the inside surface 36 of the envelope 11. This cooled surface acts as a catcher for any mercury atoms or other impurity gases such as carbon dioxide which may diffuse into the envelope 11. The liquid nitrogen cools the surface 36 to sufficient degree to cause the diffused atoms of mercury to deposit on the surface 36 and thus be removed from the glow discharge. This type of removal of the mercury atom from the glow discharge area is more fully explained in the above-identified application. Removal of these mercury atoms and other impurities insures the purity of the type of noble gas which is being utilized for the discharge and consequently permits control of the purity of the gas utilized for the glow discharge.

The target material 21, which may be a metal, or oxidized metal or any material, is positioned in a target holder 37 which is connected to the envelope 11. This holder 37, in the illustrated case, also acts as a container for a cooling liquid 38 which is introduced into the holder 37 through lines 39 and 41. The target 21 is positioned in the envelope 11 so that it is in close proximity to the crucible 17 which contains the silicone oil 18. There seems to be no critical position for locating the target 21 except that it should be positioned in close proximity to the silicone oil 18 so that the vapor can effectively coat the surface of the target 21.

After the discharge has been started by application of potential to the appropriate electrodes, the discharge heats the oil 18, thus vaporizing it. This vaporized silicone oil is distributed throughout the volume enclosed by the envelope 11 and essentially coats all of the exposed surfaces including the exposed surface of the substrate 21. As previously noted, the crucible 17 may not be energized and thus the oil 18 and crucible 17 are electrically floating. This leads to a certain evaporation rate of the silicone oil which is determined by the discharge current and geometrical arrangement. The evaporation rate may be increased by simply applying a positive or negative potential to the crucible 17 and the fluid 18. Electrons or ions then bombard the oil and this increases the heating of the target, or the evaporation rate.

As with the crucible 17, the target or substrate 21 is also electrically floating. That is to say, there is no charge applied to the substrate 21. Satisfactory polymerization of vaporized silicone oil 18 occurs simply because of the presence of the plasma which provides electron and ion bombardment and ultraviolet light for cross linking of the molecular chains in the film. The deposited film builds up to a degree which is only controlled by the length of time, the rate of evaporation, and similar factors. It has been found that an extremely thick solid layer, in excess of 1 micron, of the silicone oil may be deposited on the substrate 21 in this manner. Further tests have shown that this layer of material adheres very satisfactorily to the substrate 21 and does not have a tendency to peel, chip or otherwise separate from the substrate 21 like evaporated silicon monoxide does. In other words, the layer of silicone oil thus deposited adheres very satisfactorily to the substrate 21. This polymerization of the silicone oil seems to enhance the electrical insulating properties and other characteristics of the solid layer of silicone oil.

It has also been found that if the substrate or target 21 is maintained at a particular temperature, the resulting deposited layer of silicone oil is much more saisfactory. It has been found that if the substrate 21 is maintained at a temperature less than 150° C. during the time that the silicone oil is being deposited on the surface of the substrate, that the resulting layer has even more uniform insulating properties. The insulating properties of the deposited layer are particularly enhanced by the cooling of the substrate 21. As noted, the lines 39 and 41 may be utilized to introduce a cooling fluid such as water into the container or holder 37 so that the substrate 21 is maintained at a temperature of 150° C. or lower.

A potential might also be applied to substrate 21 in order to alter, to some degree, the electron or ion bombardment of the substrate during deposition. As noted, such bombardment seems to be an influencing factor in the polymerization of the film.

It is apparent that a number of possible alterations of the apparatus might be made in order to carry out the steps of the present invention. For instance, the plasma may be created by using an alternating current source to generate the discharge. The substrate 21 might be positioned nearly anywhere within the envelope 11 which itself could take many shapes and sizes. The substrate 21 might be cooled by a system similar to that illustrated by the reservoir 34 wherein liquid nitrogen is utilized to maintain the inside surface 36 of the envelope 11 at a reduced temperature. In this regard it might be noted that if mercury vapor is utilized to create the discharge plasma, no means is necessary for removing the mercury from the envelope 11. In this case, the mercury pool 24 simply provides adequate mercury gas to maintain a satisfactory discharge. It is to be understood that the above described arrangements are simply illustrative of the application of the principles of the invention and many other modifications may be made by those skilled in the art without departing from the spirit and scope of the invention.

Now therefore I claim:

1. A process of coating a substrate with a solid film which comprises the steps of:
   placing a crucible of liquid silicone in a chamber containing a substrate to be coated;
   evacuating the chamber;
   introducing into the chamber a gas taken from the group consisting of helium, neon, argon, krypton, xenon and hydrogen; and
   generating a discharge plasma in said gas adjacent to said substrate to vaporize the liquid silicone and to coat the substrate with a layer of the vaporized liquid silicone, said plasma being effective to provide electrons, ions and ultra-violate light for polymerizing said layer to form said solid film.

2. A process of coating a substrate with a solid film which comprises the steps of:
   positioning a crucible containing silicone oil in a chamber;
   placing the substrate in close proximity to the crucible;
   evacuating the chamber;
   introducing argon gas into the chamber;
   generating a gas discharge plasma in said gas to vaporize said oil for deposition on the substrate, said plasma including electrons and ions and emitting ultra-violet light for polymerizing the oil deposited on the substrate; and cooling the substrate to a temperature of less than 150° C. during the deposition of the evaporated oil on the substrate.

3. The process of coating a substrate with a solid, electrically insulating film which comprises:
   positioning a crucible of liquid silicone in a chamber;
   mounting the substrate in the chamber adjacent to the crucible;
   evacuating the chamber;
   introducing into the chamber a gas taken from the group consisting of helium, neon, argon, krypton, xenon and hydrogen; and
   establishing in the gas a discharge plasma adjacent to the substrate to generate heat so that said liquid silicone is vaporized for deposition on said substrate, said gas discharge plasma including electrons and ions and producing ultra-violet light for polymerizing the deposited liquid silicone to produce said solid film on the substrate.

4. The process according to claim 1 wherein an electrical potential is applied to said crucible for attracting electrons thereto for transferring additional heat to said liquid silicone.

References Cited by the Examiner

UNITED STATES PATENTS

| | | | |
|---|---|---|---|
| 2,074,281 | 3/1937 | Sommer | 204—298 X |
| 2,932,591 | 4/1960 | Goodman | 117—93.31 X |
| 3,068,510 | 12/1962 | Coleman | 117—93 X |
| 3,100,723 | 8/1963 | Weed | 117—106 X |

FOREIGN PATENTS

| | | |
|---|---|---|
| 677,784 | 8/1952 | Great Britain. |

OTHER REFERENCES

Holland, "Vacuum Deposition of Thin Films," 1956, pages 74 to 77, and 483 to 490 relied on.

ALFRED L. LEAVITT, *Primary Examiner.*

RICHARD D. NEVIUS, *Examiner.*

A. GOLIAN, *Assistant examiner.*